July 24, 1951  E. P. BURCH  2,561,904
GAS METER PROVER APPARATUS
Filed Dec. 6, 1948  2 Sheets-Sheet 1
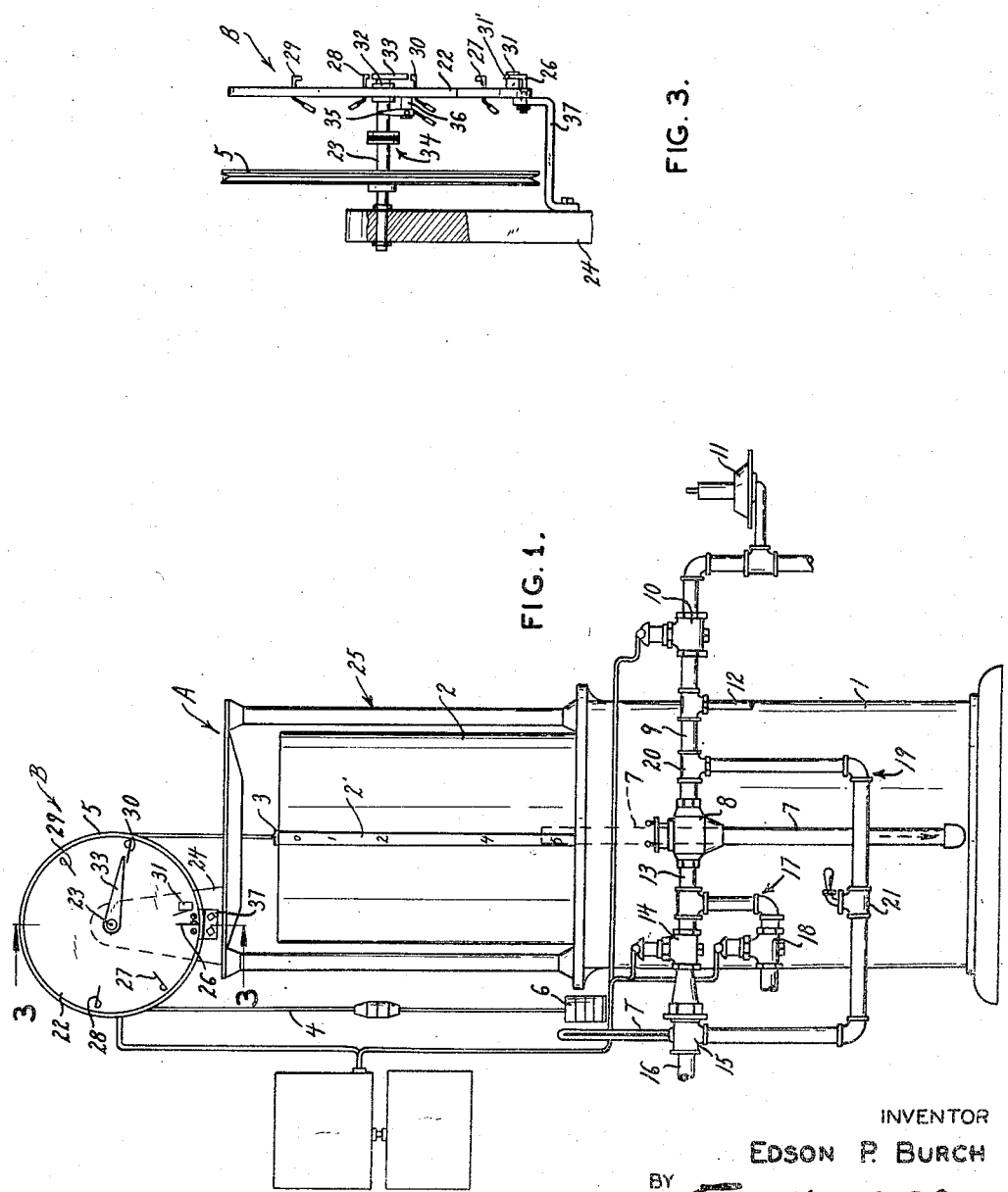
INVENTOR
EDSON P. BURCH
BY
ATTORNEY July 24, 1951  E. P. BURCH  2,561,904
GAS METER PROVER APPARATUS
Filed Dec. 6, 1948  2 Sheets-Sheet 2
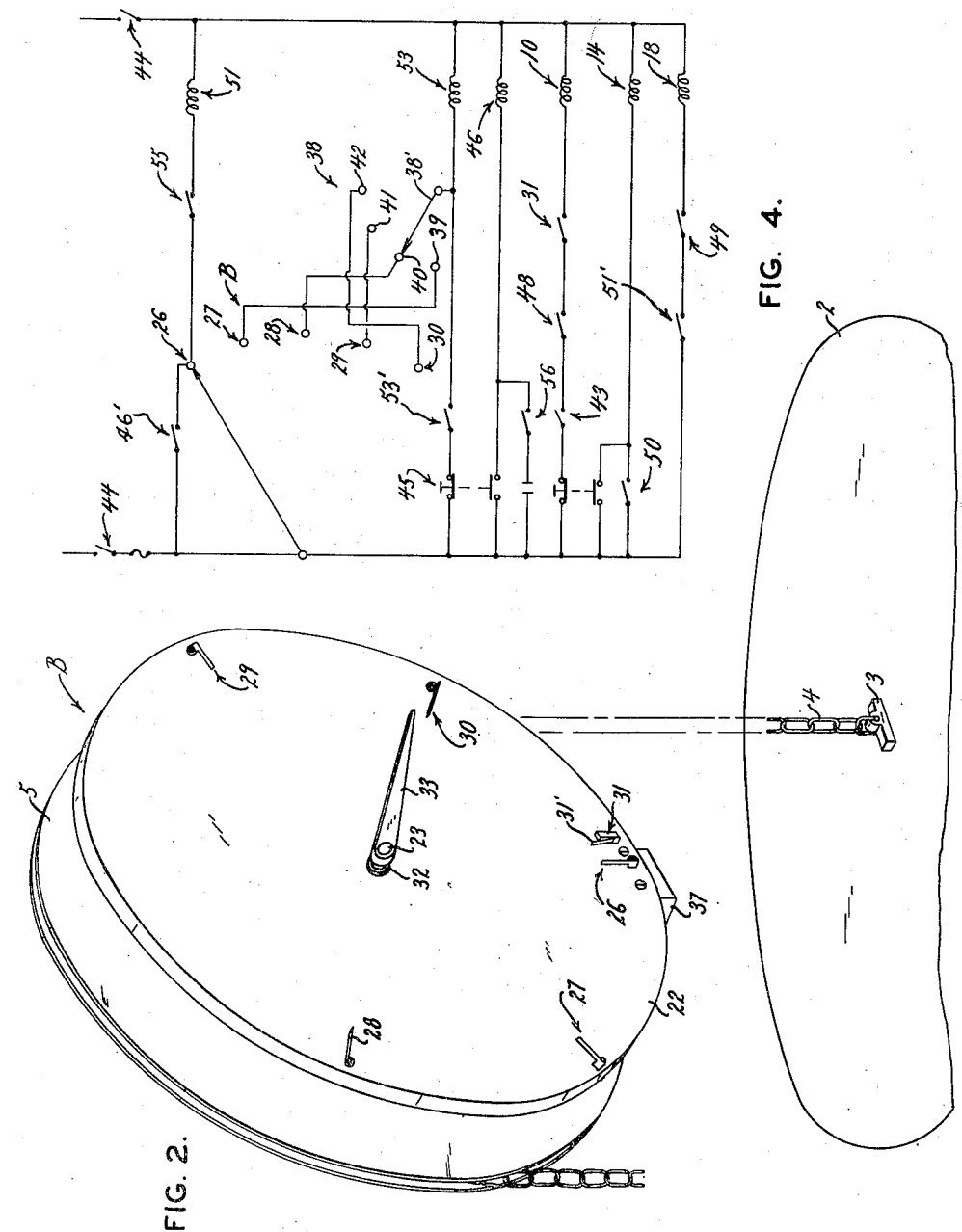
INVENTOR
EDSON P. BURCH
BY Em Harrington
ATTORNEY Patented July 24, 1951

2,561,904

UNITED STATES PATENT OFFICE 2,561,904

GAS METER PROVER APPARATUS

Edson P. Burch, Webster Groves, Mo., assignor to Electronic Tester of Gas Meters, Inc., St. Louis, Mo., a corporation of Missouri Application December 6, 1948, Serial No. 63,786

6 Claims. (Cl. 73—3)

This invention relates to gas meter prover apparatus of the type adapted for use in testing the accuracy of movement and registration of the registering means of gas meters by passing through the gas meters being tested accurately measured volumes of air, or other fluid, the predominant object of the invention being to provide an improved apparatus of this type which is relatively simple in construction and operation, and is so completely automatic in its operation that the opportunity for human error to effect the gas meter testing operations is reduced to a minimum.

Commercial gas meters of various types having bellows displacement means for determination of the volume of gas passed through the meters, and provided with geared indexing means for registering said volume of gas passed through the meters, have heretofore been tested for accuracy by passing through the meters accurately measured volumes of air from accurately calibrated air tanks or prover bells connected to the meters and controlled manually. In making this type of test, the operator observed the movement of the prover index hand with respect to the meter prover dial while passing an amount of air through the meter that would cause the prover index hand to make one revolution, which was equivalent to the registration of passage through the meter of two cubic feet of air. The accuracy of such a test was dependent on the keenness of the eye of the operator making the test, and his coordination of eye and hand, inasmuch as the flow of air to the meter was shut off manually by the operator when the index hand of the meter had made a complete revolution, as nearly as could be judged by the eye, and the actual volume passed through the meter was determined by the shrinkage in volume of the air in the air tank or prover bell. If the test indicated that the volume of air passed through the meter was more or less than exactly two cubic feet, the meter was registered as either fast or slow and proper adjustments were made of its mechanism to bring it to accuracy, the test being repeated until the meter registered accurately.

The testing operation briefly described above was subject to a number of possibilities of error, and the prime purpose of this invention is to provide a simple and improved testing apparatus in the use and operation of which these possibilities of error are eliminated. Briefly stated, the starting and stopping of the gas meter prover of the present invention is controlled automatically through the operation of electrical means that controls flow of electrical current that operates electrical means which opens and closes valve means when exactly the predetermined volume of air to be used in the test has been passed from the bell of the prover, to the meter under test. The apparatus of the present invention differs in its operation from the manual meter testing method described above, in that an accurately calibrated prover bell is established as the standard of comparison and the flow of air from this prover bell to the meter under test is accurately controlled in an automatic manner so as to eliminate human error.

Fig. 1 is a front elevation of the improved gas meter prover apparatus of the present invention.

Fig. 2 is a perspective view of a portion of the meter prover apparatus of this invention.

Fig. 3 is an enlarged, fragmentary, vertical section taken on line 3—3 of Fig. 1.

Fig. 4 is a diagrammatical view illustrating the electrical wire arrangement of the improved gas meter prover apparatus of the present invention.

In the drawings, wherein is shown for purposes of illustration, merely, one embodiment of the invention, A designates in Fig. 1 the gas meter prover apparatus generally. The gas meter prover apparatus A comprises a lower tank portion 1 and a bell 2 which is supported for vertical movement with respect to said lower tank portion 1, there being a body of water (not shown) contained in the lower tank portion 1 whose surface provides the bottom wall of an air chamber within the bell. The bell 2 has attached to its upper portion, by means of a suitable attaching element 3, a sprocket chain 4, said sprocket chain being passed over a rotatably supported sheave 5 and having weights 6 attached to its free end which serve to counterbalance the weight of the bell 2.

Forming a part of the gas meter prover apparatus A is a pipe assembly which includes a pipe 7 that communicates with the air chamber within the bell 2 and extends downwardly therefrom within the interior of the lower tank portion 1 of the prover, said pipe 7 extending through a lower wall portion of the prover tank and extending upwardly at the exterior of the lower tank portion of the prover to a member 8. Connecting into the member 8 is a pipe 9 which leads from a source of air (not shown), said pipe 9 being provided with a magnetic valve 10 which, as will presently appear herein, controls the passage of air into the air chamber of the prover bell 2. The pipe 9 is provided also with a pressure regulator 11 which controls the pressure of the air that passes through said pipe 9 to the air chamber of the prover bell, and additionally said pipe 9 is provided with a connection 12 which is adapted to lead to a pressure gauge (not shown).

Connected into the member 8 is a pipe 13 in which is interposed a magnetic valve 14, said magnetic valve 14 being connected to a connection 15 into which is also connected a pipe 16 which leads to the inlet of a meter to be tested, said magnetic valve 14 serving to control the flow of air from the prover bell 2 to a meter being tested with the aid of the gas meter prover apparatus. Connected into the pipe 13 is a pipe and fitting assembly 17, and connected into said pipe and fitting assembly 17 is a magnetic valve 18 which, as will presently appear herein, serves to control leveling of the prover bell 2 by venting air from said bell to atmosphere. Additionally, the general pipe assembly of the gas meter prover apparatus includes a pipe and fitting assembly 19 which provides a by-pass around the magnetic valves 14 and 18, one end of said by-pass being connected into a fitting 20 which is connected in the pipe 9, and the opposite end of said by-pass being connected into the fitting 15 into which the magnetic valve 14 and the pipe 16 are connected. The pipe and fitting assembly 19 which provides the by-pass around the magnetic valves 14 and 18 has interposed therein a manually operable valve 21 which, on actuation thereof, permits air to flow from the prover bell 2 to the meter being tested to allow for manual testing of the meter, if required, or to permit purging of the meter so as to bring the prover index dial hand of the meter to its starting position. If desired, the fitting 15 may have connected thereto a suitable thermometer T, in order that the temperature of the air passing to the meter being tested may be indicated.

The improved gas meter prover apparatus of this invention is provided with a control unit B which includes the sprocket chain 4 and the sheave 5, previously referred to herein. Also, forming a part of the control unit B is a disk 22 which is fixedly supported, and a shaft 23 which is supported in a horizontal position by a bracket 24, said bracket in turn being supported by a frame structure 25 which is suitably mounted atop the lower tank portion 1 of the gas meter prover apparatus A, as is shown in Fig. 1. The disk 22 has mounted thereon a plurality of electrical switch contacts which are designated, respectively, by the reference characters 26, 27, 28, 29 and 30. Additionally, the disk 22 supports a limit switch 31, which serves a purpose to be hereinafter set forth. The switch contacts 26, 27, 28, 29 and 30 may be of any suitable construction and arrangement but for purposes of this disclosure such switch contacts are illustrated as being of the type having each a resilient leaf formed of electrical conductive material.

By referring to Fig. 3 it will be noted that the disk 22 is provided with a bearing 32, formed of electrical insulating material, through which the shaft 23 extends for axial rotation therein, and fixedly mounted on the outer end portion of the shaft 23 is a contact arm 33 which is adapted to make electrical contact with the switch contacts 26, 27, 28, 29 and 30, said arm 33 being adapted, also, to mechanically actuate the limit switch 31 when it makes mechanical contact with a movable actuating part 31' thereof. The shaft 23 is provided with an insulating coupling 34 between parts thereof, and contacting with the forward portion of said shaft is a collector spring 35 which is supported by a stud 36 that extends rearwardly from the disk 22, as is shown in Fig. 3. This collector spring is electrically connected into the electrical wiring system of the improved gas meter prover apparatus so that said forward portion of the shaft 23 and the switch arm 33 carried thereby are energized when power is on. Also, the switch contacts 26, 27, 28, 29 and 30, and the limit switch 31 are electrically connected into the electrical wiring system of the improved gas meter prover apparatus with the result that electrical energy is passed from the contact arm 33 to one of the switch contacts 26, 27, 28, 29 and 30 when the contact arm 33 contacts with said one of said switch contacts, and during such contact engagement. The disk 22 is held stationary by a bracket arm 37 which is secured at one of its ends to the bracket 24 and at its opposite end to said disk. Also, the switch contacts 26, 27, 28, 29, and 30, and the limit switch are suitably electrically insulated from the disk 22.

In describing the operation of the improved gas meter prover apparatus of the present invention, it will be assumed that the electrical power is off and that the prover bell 2 is in its lowermost position with a meter to be tested connected to the prover apparatus. Let it be assumed, also, that it is desired to pass two cubic feet of air through the meter being tested in performing the meter testing apparatus. As is shown in Fig. 4, the electrical wiring system of the gas meter prover A includes a selector switch 38 which includes a movable contact element 38', and fixed contacts 39, 40, 41 and 42. The movable contact element 38' of the selector switch 38 is movable into and out of contact engagement with respect to said contacts 39, 40, 41 and 42, and in preparing for a meter test said movable contact element of the selector switch is moved into contact with the proper contact of the contacts 39, 40, 41, and 42, the contact 40, for instance. Additionally, the wiring system of the gas meter prover includes an air switch 43 (Fig. 4) and in preparing for a meter test this air switch is closed, as is the power switch 44. This energizes and opens the air valve 10 so as to cause air to flow into the bell 2 causing said bell to move upwardly, and during such upward movement of the bell 2 the switch arm 33 of the control unit B rotates with respect to the disk 22. When the bell 2 reaches its extreme upper position the switch arm 33 of the control unit engages and actuates the limit switch 31 whereby the air valve 10 is de-energized and closed to place the prover in condition for a test.

The actual test is started by depressing a start button 45 momentarily and this energizes a relay 46 which seals itself in through contacts 46'. The relay contacts 48 open thereby disabling the air valve circuit so that said air valve 10 will not open as soon as the switch arm 33 of the control unit B moves away from the limit switch 31, and relay contacts 49 close so as to energize and open the vent valve 18 and release air in the prover bell 2 to atmosphere and thus permit the prover bell to descend.

As the bell 2 descends the switch arm 33 of the control unit B rotates in a clockwise direction, and when the bell 2 descends to a point where the switch arm 33 makes electrical contact with the switch contact 26, which represents the zero point on the scale 2' of the prover bell, the contacts 46' are picked up with the result that said contacts 46' are sealed in through the contacts 50, and a relay 51 de-energizes the vent valve 18 by opening the contacts 51', and opens the valve 14 by closing the contacts 46'. The closing and opening of the valves 18 and 14 transfers the flow of air from atmosphere to the meter being tested so that air is caused to flow from the descending bell 2 through the meter under test, such flow of air to the meter starting at the zero point of the prover scale 2'.

The test is ended by the switch arm 33 moving into contact engagement with whichever switch contact 27, 28, 29, or 30 is connected by the selector switch 38 to the relay 53. In Fig. 4 the two cubic feet switch contact 28 of the control unit B is connected by the selector switch 38 to the relay 53 and when the switch arm of the control unit B contacts with the switch contact 28 the test is ended by the opening of the contacts 55, such opening of said contacts 55 de-energizing the relay 51, which drops out, opening contacts 50 in the circuit of the valve 14 so as to de-energize and close said valve 14. Contacts 55 also open thereby dropping out relay 46 whereupon contacts 48 reclose, re-establishing the circuit of the air valve 10, and the prover bell refills with air until the limit switch 31 of the control unit B is actuated and the air valve 10 is de-energized. The prover is now ready for the next test and when again set in operation to perform another test the depression of the start button 45 will first de-energize the relay 53, since it is left sealed in after every test, the second test being otherwise the same as described above. The operation of the purge button simply opens the valve 18 while closing the valve 10.

It is important to note that the switch contacts 26, 27, 28, 29 and 30 of the control unit B are related, respectively, to the zero, one, two, four, and five cubic feet marks on the scale 2' of the bell 2 of the gas meter prover A, and that the switch contacts 27, 28, 29, and 30 are electrically connected, respectively, to the contacts 39, 40, 41, and 42 of the selector switch 38. Therefore, the amount of air passed through a meter under test may be established by merely setting the movable contact element 38' of the selector switch 38 on the appropriate selector switch contact, and the descent of the bell during a test will stop when the switch arm 33 of the control unit B contacts with the switch contact 27, 28, 29, or 30 which is in electrical connection with the contact of the selector switch 38 that is in contact engagement with the selector switch element 38'.

The switch contacts 26, 27, 28, 29, and 30 of the control unit B are of the wiping type and since said contacts are closed on movement of the switch arm 33 in either direction on upward or downward movement of the prover bell 2, provision must be made to de-energize the "zero" switch contact 26 on upward movement of the prover bell. This is accomplished by the lock-in contacts 53' which, when the prover reaches the reset position, locks in the relay 53 until the bell 2 has re-cycled and the start button is pressed.

I claim:

1. A meter-testing apparatus comprising a prover including a movable member providing a chamber for a meter-testing medium, conduit means leading from said chamber of said movable member and adapted to be connected to a meter to be tested, an electrically actuated valve interposed in said conducting means and operable to control passage of testing medium from said chamber of said movable member to a meter being tested, and electrical means for controlling actuation of said electrically actuated valve, the last-mentioned means comprising a switch having a pair of contact elements one of which is movable in a rotary manner into contact engagement with the other in response to movement of said movable member of the prover so as to cause electrical actuation of said electrically actuated valve.

2. A meter-testing apparatus comprising a prover including a movable member providing a chamber for a meter-testing medium, conduit means leading from said chamber of said movable member and adapted to be connected to a meter to be tested, an electrically actuated valve interposed in said conducting means and operable to control passage of testing medium from said chamber of said movable member to a meter being tested, and electrical means for controlling actuation of said electrically actuated valve, the last-mentioned means comprising a switch including a unit in the form of a contact member and a unit in the form of a plurality of contact elements, one of said units being movable in response to movement of said movable member of the prover in a rotatable manner with respect to the other of said units to bring about effective contact engagement between said contact member and one of said contact elements of said plurality of contact elements so as to cause electrical actuation of said electrically actuated valve.

3. A meter-testing apparatus comprising a prover including a movable member providing a chamber for a meter-testing medium, conduit means leading from said chamber of said movable member and adapted to be connected to a meter to be tested, an electrically actuated valve interposed in said conducting means and operable to control passage of testing medium from said chamber of said movable member to a meter being tested, and electrical means for controlling actuation of said electrically actuated valve, the last-mentioned means comprising a switch including a unit in the form of a contact member and a unit in the form of a plurality of contact elements, one of said units being movable in response to movement of said movable member of the prover in a rotatable manner with respect to the other of said units to bring about effective contact engagement between said contact member and one of said contact elements of said plurality of contact elements so as to cause electrical actuation of said electrically actuated valve, and means for selecting and rendering effective one or another of said contact elements.

4. A meter-testing apparatus comprising a prover including a movable member providing a chamber for a meter-testing medium, conduit means leading from said chamber of said movable member and adapted to be connected to a meter to be tested, an electrically actuated valve interposed in said conducting means and operable to control passage of testing medium from said chamber of said movable member to a meter being tested, and electrical means for controlling actuation of said electrically actuated valve, the last-mentioned means comprising a switch including a unit in the form of a contact member and a unit in the form of a plurality of contact elements, one of said units being movable in response to movement of said movable member of the prover in a rotatable manner with respect to the other of said units to bring about effective contact engagement between said contact member and one of said contact elements of said plurality of contact elements so as to cause electrical actuation of said electrically actuated valve, and electrical means for selecting and rendering effective one or another of said contact elements.

5. A meter-testing apparatus comprising a prover including a movable bell providing a chamber for a meter-testing medium, a flexible element attached to said bell, a rotatably supported member over which said flexible element passes, conduit means leading from said chamber of said bell and adapted to be connected to a meter to be tested, an electrically actuated valve interposed in said conducting means and operable to control passage of testing medium from said chamber of said bell to a meter being tested, and electrical means for controlling actuation of said electrically actuated valve, the last-mentioned means comprising a switch including a unit in the form of a contact member and a unit in the form of a plurality of contact elements, one of said units being rotatable with said rotatably supported member in response to movement of said bell with respect to the other of said units to bring about effective contact engagement between said contact member and one of said contact elements of said plurality of contact elements so as to cause electrical actuation of said electrically actuated valve.

6. A meter-testing apparatus comprising a prover including a movable bell providing a chamber for a meter-testing medium, a flexible element attached to said bell, a rotatably supported member over which said flexible element passes, conduit means leading from said chamber of said bell and adapted to be connected to a meter to be tested, an electrically actuated valve interposed in said conducting means and operable to control passage of testing medium from said chamber of said bell to a meter being tested, electrical means for controlling actuation of said electrically actuated valve, the last-mentioned means comprising a switch including a unit in the form of a contact member and a unit in the form of a plurality of contact elements, one of said units being rotatable with said rotatably supported member in response to movement of said bell with respect to the other of said units to bring about effective contact engagement between said contact member and one of said contact elements of said plurality of contact elements so as to cause electrical actuation of said electrically actuated valve, and means for selecting and rendering effective one or another of said contact elements.

EDSON P. BURCH.

REFERENCES CITED

The following references are of record in the file of this patent:

UNITED STATES PATENTS

| Number | Name | Date |
|---|---|---|
| 1,691,360 | Reagan | Nov. 13, 1928 |
| 1,934,291 | Baas | Nov. 7, 1933 |
| 2,135,061 | Wagner et al. | Nov. 1, 1938 |
| 2,199,010 | Robb | Apr. 30, 1940 |
| 2,448,616 | Oakley et al. | Sept. 7, 1948 |